United States Patent [19]

Lumbra et al.

[11] Patent Number: 5,103,347

[45] Date of Patent: Apr. 7, 1992

[54] MIRROR

[76] Inventors: Clayton Lumbra, 697-5 S. End Rd., Plantsville, Conn. 06479; Tracy Bazzano, P.O. Box 1372, Torrington, Conn. 06791

[21] Appl. No.: 659,621

[22] Filed: Feb. 25, 1991

[51] Int. Cl.$^5$ ............................................. G02B 7/18
[52] U.S. Cl. .................................... 359/871; 248/489; 248/493
[58] Field of Search ................ 350/631, 638; 248/489, 248/493

[56] References Cited

U.S. PATENT DOCUMENTS 4,712,892 12/1987 Masucci ............................ 350/631
4,902,118 2/1990 Harris ................................. 350/631

Primary Examiner—Bruce Y. Arnold
Assistant Examiner—J. P. Ryan

[57] ABSTRACT

A mirror for attachment to an article including a frame having a reflective surface on one side and a plurality of straps including fasteners for attachment to the article with the reflective surface facing away from the article.

2 Claims, 2 Drawing Sheets

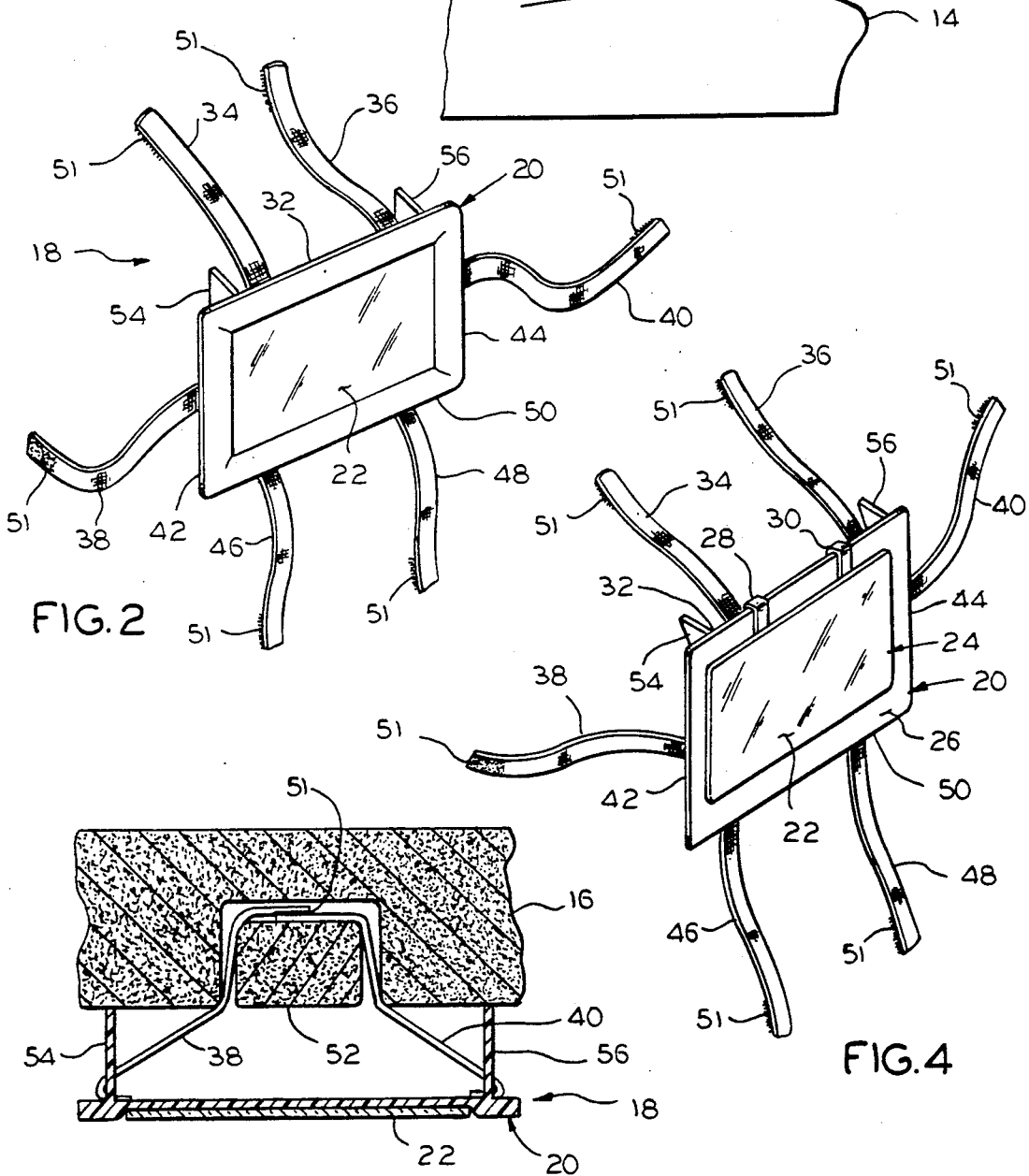

MIRROR

BACKGROUND OF THE INVENTION

This invention relates to mirrors. More particularly, this invention relates to a mirror that can be attached to a variety of different objects and in particluar to the back cushion of either the front or rear seat of an automobile for viewing by an infant seated in a child's safety car seat positioned on the rear seat of the vehicle or to, for example, a child's playpen or crib.

Safety requires that infants be securely seated and restrained in infant car seats especially designed for their safety. These seats are designed with high backs and in the case of very young infants are typically secured to vehicle seats such that the infant faces rearwardly in the vehicle, that is, facing toward the seat back cushion, which of course restricts the infant's ability to see forwardly. When these seats are secured in the rear seat of the vehicle, the infant's vision is severely restricted and in particular, when faced rearwardly, the infant is unable to view or make visual contact with the driver of the vehicle and the driver also cannot directly see the infant. Should the infant be crying or otherwise disturbed or need assistance or attention, the driver cannot view the infant to determine what is affecting the child and if the child needs immediate assistance. Also, infants need attention, personal contact as well as things to occupy their imagination and attention especially when confined in a vehicle and even more so when their freedom to move about is restricted and they are unable to make contact with those they recognize such as a parent driving the vehicle or when left alone in a crib or playpen.

Accordingly, it is the object of the invention to provide for a device which functions both as a novelty item to amuse an infant and to provide a driver of a vehicle with the ability to view an infant restrained in an infant car seat for convenience and safety purposes.

SUMMARY OF THE INVENTION

According to the invention, there is provided a frame member having a reflective surface on one side and means for attaching the frame member to various different mounting surfaces and members.

According to a preferred embodiment, the means for attaching the frame is adapted to attach the frame to the seat back cushion of a seat of an automobile so that an infant seated in a car seat on the lower cushion can view himself in the refective surface.

According to a preferred embodiment of the invention, the means for attaching the frame member includes a plurality of straps extending from opposite edges of the frame having means at their free ends for being releasably secured to the mounting surface or member.

According to one embodiment, the means for securing the straps is a pressure sensitive adhesive on the free ends of the straps.

According to another embodiment, the means for securing the straps includes hook and loop type grippers at the free ends of the straps.

According to a still further important feature of the invention, the straps extending from opposite side edges of the frame are provided with hook and loop type fasteners on opposing sides of the respective free ends of the straps such that the straps are receivable around the member to which the device is to be mounted with the hook and loop type fasteners secured together.

According to another important feature, the frame is provided with means on a rear side for orientating the reflective surface substantially vertical when the frame is attached to an upwardly rearwardly angled mounting surface.

According to a still further important feature of the invention, the reflective surface is part of a separate clip on type mirror removably attachable to the frame member.

BRIEF DESCRIPTION OF THE DRAWINGS

The invention will be better understood after reading the following Detailed Description of the Preferred Embodiment in conjunction with the drawings in which:

FIG. 1 is a side view of an infant seated in an infant car seat positioned on the rear seat of a vehicle facing rearwardly with the mirror according to the invention attached to the rear seat rear cushion;

FIG. 2 is a perspective view of a preferred embodiment of the mirror according to the invention showing details of construction;

FIG. 3 is a transverse cross sectional view taken along line 3—3 in FIG. 1 showing details of attachment of the mirror to a pivotable arm rest of a vehicle seat;

FIG. 4 is a perspective view of an alternative embodiment of the invention incorporating a removable clip on type mirror;

DETAILED DESCRIPTION OF THE PREFERRED EMBODIMENT

Figure 5:
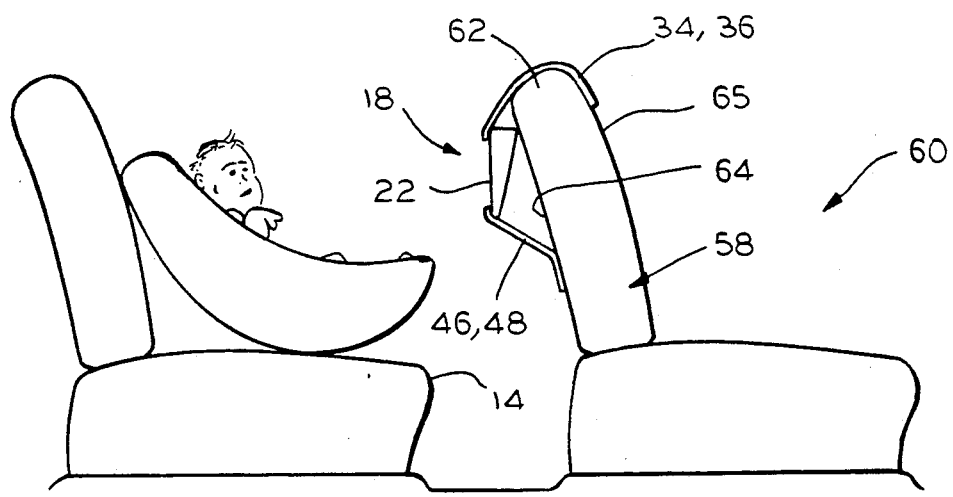
FIG. 5 is a side view of an infant seated in an infant car seat positioned on the rear seat of a vehicle facing forward with the mirror according to the invention attached to the rear cushion of the front seat of the vehicle.

Although the mirror according to the invention is described herein as used in an automobile or a playpen setting, it is to be understood that such applications are not to be considered exhaustive or as limiting the invention, but rather as only representative of preferred applications.

Shown in FIG. 1 is an infant 10 seated in an infant car seat 12 secured on a lower seat cushion 14 of a rear seat of a vehicle facing the rear seat back cushion 16 of the seat. The mirror 18 according to the invention is secured to the rear seat back cushion 16 in the line of sight of the child so that the child can view both himself as well as, for example, a driver of the vehicle not shown in the drawings.

Referring to FIGS. 2 and 4, the mirror 18 includes a frame 20 having a planar frontal reflective surface 22 which, in the embodiment shown in FIG. 2, is provided as an intregal part of the frame whereas, in the embodiment shown in FIG. 4, the reflective surface is provided in the form of a separate mirror 24 removably mounted to a planar surface 26 of the frame. The mirror can be any well known mirror such as, for example, a common car visor mounted mirror which includes clips 28, 30 for receipt over a top edge 32 of the mounting frame as shown in FIG. 4. Preferably, the reflective surface, whether formed as an intregal part of the frame or provided as a separate member, should be a non-glass or at least shatterproof safety glass.

Regardless of the form of reflective surface, the frame 18 is provided with a plurality of straps such as one pair 34, 36 extending from the top edge 32 of the frame, another pair 38, 40 extending from opposite side edges 42, 44 of the frame and, if desired, a third pair of straps 46, 48 extending from the lower edge 50 of the frame. Free end portions of each strap are provided with means 51 for releasably attaching the straps to a mounting surface such as the surface of the rear cushion of the vehicle seat in the application shown. The attachment means can be, for example, areas of pressure sensitive adhesive for attachment to vinyl or leather surfaces or hook and loop type fasteners such as VELCRO for attachment to cloth seat materials.

As shown in FIG. 3, if desired, the straps extending from the opposite side edges of the frame are provided with hook and loop type grippers on opposite sides of the respective strap end portions and are adapted to encircle and be secured together around a mounting member such as a common pivotable arm rest 52 of a rear seat in the stored position of the arm rest. Advantageously, this attachment means provides for improved retention of the frame to the seat.

Also, as shown in FIG. 1, most rear seat backs in automobiles slope or angle generally rearwardly and upwardly and accordingly, in order to orientate the reflective surface generally vertically and in the line of sight of the child, the rear of the frame is provided with projections in the form of tapered members 54, 56 which contact the rear cushion and compensate for the slant or slope of most rear seat backs.

When used in applications where the child is orientated facing rearwardly, as shown in FIG. 1, the frame is placed against the rear seat back in the line of sight of the child when placed in the child car seat and the retention straps are fastened to the surface of the seat back or, in the case where an arm rest is present, the side straps can be attached around the retracted arm rest. When so attached, the child is able to view himself in the mirror and, advantageously, the driver of the vehicle, utilizing the vehicle's rear view mirror, can view the child's face in the mirror of the present invention without having to physically turn around away from the driving position.

As shown in FIG. 5, the mirror 18 is also attachable to the back side 64 of a rear cushion 58 of a front seat 60 of a vehicle in the line of sight of the child orientated on the rear seat 14 facing forwardly by placing the top straps 34, 36 of the frame over the top 62 of the front seat back cushion 58 and securing the attachments on the top straps to the front surface 65 of the cushion 58. The angle of the frame can be adjusted to place the reflective surface 22 in the child's line of sight by orientating the frame and securing the lower straps 46, 48 to the back surface 64 of the cushion to hold the frame at the desired angle.

Figure 6:
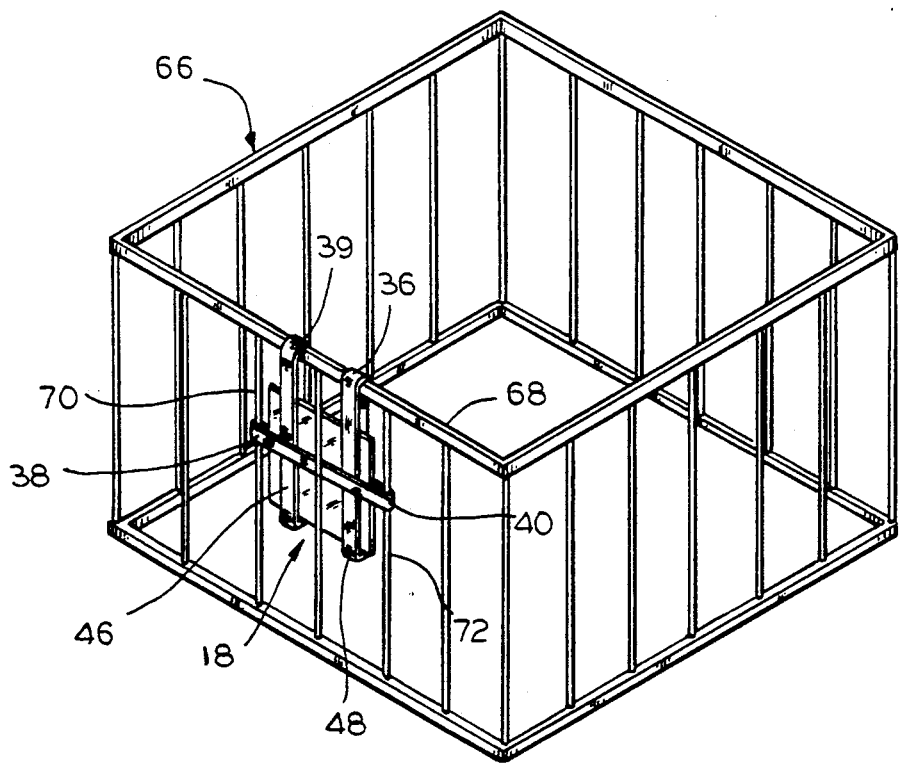
FIG. 6 is a pictorial view of a playpen showing the mirror according to the invention attached to the playpen.

A further application of the mirror according to the invention is shown in FIG. 6 wherein the mirror 18 is attached to the walls of a crib or playpen 66 by draping the top straps 34, 36 over a top horizontal rail 68 of the playpen and securing the attachments on the top straps to those on the lower pair of straps 46, 48 so that the mirror hangs from the top rail. If desired, the side straps 38, 40 can be encircled about vertical posts 70, 72 and fastened together to further secure the mirror.

Having described the preferred embodiment of the invention, those skilled in the art having the benefit of this description and the accompanying drawings can readily devise other embodiments and modifications which other embodiments and modifications are to be considered to be within the scope of the appended claims.

What is claimed is:

1. A mirror for attachment to an article comprising: a frame having a planar reflective surface on one side; and a plurality of straps including at least one strap extending from at least a top edge and one extending from each of a pair of opposing side edges of said frame, free ends of the at least one strap extending from the top edge including means for attaching said at least one strap to a surface of said article and free ends of each of the straps extending from the opposite side edges of the frame include hook and loop type fastener means, said hook and loop type fastener means on the strap extending from one side edge being on a side of the strap opposite to the side on which the hook and loop fastener is on on the strap that extends from the opposite edge of the frame.

2. The mirror as defined in claim 1 including at least one strap extending from a bottom edge of the frame including hook and loop fastener means.

* * * * *